(12) United States Patent
Tanahashi et al.

(10) Patent No.: US 8,551,631 B2
(45) Date of Patent: Oct. 8, 2013

(54) ASSEMBLED BATTERY, AND VEHICLE EQUIPPED WITH THE ASSEMBLED BATTERY

(75) Inventors: Takayuki Tanahashi, Nissin (JP); Takahiko Yamamoto, Obu (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 202 days.

(21) Appl. No.: 12/918,559

(22) PCT Filed: Mar. 3, 2009

(86) PCT No.: PCT/IB2009/000403
§ 371 (c)(1), (2), (4) Date: Aug. 20, 2010

(87) PCT Pub. No.: WO2009/109834
PCT Pub. Date: Sep. 11, 2009

(65) Prior Publication Data
US 2011/0008656 A1    Jan. 13, 2011

(30) Foreign Application Priority Data
Mar. 6, 2008 (JP) .................. 2008-056699

(51) Int. Cl.
*H01M 2/12* (2006.01)
(52) U.S. Cl.
USPC .......................................................... 429/71
(58) Field of Classification Search
None
See application file for complete search history.

(56) References Cited

FOREIGN PATENT DOCUMENTS

| | | |
|---|---|---|
| DE | 296 12 571 U1 | 10/1996 |
| EP | 0 814 530 A1 | 12/1997 |
| JP | 9-199179 | 7/1997 |
| JP | 2001-57196 | 2/2001 |
| JP | 2005-116438 | 4/2005 |
| JP | 2006-260967 | 9/2006 |
| WO | WO 2008/050211 A1 | 5/2008 |
| WO | WO 2008050211 A1 * | 5/2008 |

OTHER PUBLICATIONS

International Search Report in International Application No. PCT/IB2009/000403; Mailing Date: May 28, 2009.
Written Opinion of the International Searching Authority in International Application No. PCT/IB2009/000403; Mailing Date: May 28, 2009.

* cited by examiner

*Primary Examiner* — Ula C Ruddock
*Assistant Examiner* — Daniel Gatewood
(74) *Attorney, Agent, or Firm* — Finnegan, Henderson, Farabow, Garrett & Dunner, LLP

(57) ABSTRACT

An assembled battery that secures a heat-dissipation characteristic and has a uniform thickness (size) of unit cells that constitute the assembled battery in a direction of arrangement is provided. In an assembled battery in which a plurality of unit cells are arranged in an arrangement direction, in a unit cell container of at least one of the plurality of unit cells, one or more gap-filling members that fill in a gap between an electrode body and two side walls of the cell container are inserted, and the one or more gap-filling members are disposed so that a distance between the electrode body and a channel-side side wall that directly faces a channel through which a cooling medium passes is shorter than a distance between the electrode body and a non-channel-side side wall that does not directly face the channel.

9 Claims, 6 Drawing Sheets

ASSEMBLED BATTERY, AND VEHICLE EQUIPPED WITH THE ASSEMBLED BATTERY

CROSS-REFERENCE TO RELATED APPLICATIONS

This application is a national phase application of International Application No. PCT/IB2009/000403, filed Mar. 3, 2009, and claims the priority of Japanese Application No. 2008-056699, filed Mar. 6, 2008, the contents of both of which are incorporated herein by reference.

BACKGROUND OF THE INVENTION

1. Field of the Invention

The invention relates to an assembled battery in which a plurality of chargeable/dischargeable electric unit cells (secondary cells) are connected in series. Specifically, the invention relates to an assembled battery that is suitable to be mounted in a vehicle, and also relates to a structure of a unit cell that constitutes the assembled battery, and to a vehicle in which the assembled battery is mounted.

2. Description of the Related Art

Assembled batteries formed by connecting in series a plurality of unit cells, such as lithium-ion cells, nickel hydride cells, other secondary cells, or electric storage elements, such as capacitors or the like, are rising in importance as high-output electric power sources for use as vehicle-mounted electric power sources, or electric power sources of personal computers or portable communication terminals. Particularly, an assembled battery formed by series-connecting a plurality of lithium-ion cells as unit cells that are light in weight but capable of providing high energy density is expected to be favorably used as a vehicle-mounted high-output electric power source.

In this kind of assembled battery constructed of a plurality of unit cells, heat is produced within each of the unit cells constituting the assembled battery when the assembled battery is charged or discharged. Therefore, it is required that the assembled battery certainly have a heat dissipation characteristic so as to rapidly release the produced heat and thus cool off. A proposed related-art technique that meets the requirement is a technique in which cooling wind passageways are provided between adjacent unit cells to better the heat dissipation characteristic of the assembled battery (e.g., in Japanese Patent Application Publication No. 2006-260967 (JP-A-2006-260967)). Other examples of the related art include those described in Japanese Patent Application Publication No. 9-199179 (JP-A-9-199179), Japanese Patent Application Publication No. 2001-57196 (JP-A-2001-57196), and Japanese Patent Application Publication No. 2005-116438 (JP-A-2005-116438).

By the way, since the assembled battery mounted in a vehicle, such as a motor vehicle or the like, is provided on the assumption of the use in a vibrating environment in addition to the limited mounting space, the vehicle-mounted assembled battery is constructed with many unit cells being arranged and constrained (i.e., unit cells being fastened to each other). At the time of constraining the unit cells that constitute an assembled battery, a considerable load is applied to each unit cell.

The considerable load applied at the time of the constraining process gives rise to a problem of a cell container body (i.e., an exterior body that houses electrode bodies and an electrolyte) bending or deforming in the direction of load. The distortion of the container body becomes a factor of the deviation and variation of the distance (dimension) or the relative position between the positive and negative electrode terminals of each unit cell that are to be connected in series from the initially designed ideal values, and is therefore not preferable.

Although it may be considered appropriate to use a thick-walled container made of a hard-to-deform material in order to solve the foregoing problem, the thick-walled container made of such a material is not desirable from the standpoint of weight reduction of the assembled battery. Besides, it does not suffice to simply prevent deformation of the container, but it is also necessary to secure sufficient heat dissipation characteristic of the assembled battery.

SUMMARY OF THE INVENTION

The invention provides an assembled battery that secures a heat dissipation characteristic and has a uniform shape of the unit cells that constitute the assembled battery and, particularly, a uniform thickness (size) of the unit cells in a predetermined direction of arrangement in a state where the cells are constrained with a load applied thereto in the arrangement direction, and also provides a vehicle equipped with the assembled battery.

A first aspect of the invention is an assembled battery in which a plurality of unit cells are arranged in an arrangement direction. Each of the unit cells includes an electrode body that includes a positive electrode and a negative electrode, and a container that houses the electrode body. Two side walls of each unit cell container that are juxtaposed in the arrangement direction (e.g., side walls of a box-shape cell container that form wider faces of the container) are a channel-side side wall that directly faces a channel through which a cooling medium passes, and a non-channel-side side wall that does not directly face the channel. Besides, in the unit cell container of at least one of the unit cells arranged, one or more gap-filling members that fill in a gap between the electrode body and the two side walls are inserted. The one or more gap-filling members in each container are disposed so that a distance between the channel-side side wall and the electrode body is shorter than a distance between the non-channel-side side wall and the electrode body.

According to the assembled battery constructed as described above, a gap within a container that can occur in one or more of the unit cells of the assembled battery, typically a gap that occurs due to nonuniform shapes of electrode bodies housed within containers, can be filled in by one or more gap-filling members. This prevents the external shape of one or more of the unit cells from being deformed by the load that acts in the arrangement direction at the time of constraint, and therefore can realize the uniformity of the shapes of the unit cells (particularly, the thicknesses thereof in the arrangement direction).

In addition, since the one or more gap-filling members in each container are disposed so that the distance between the channel-side side wall and the electrode body is shorter than the distance between the non-channel-side side wall and the electrode body, heat produced within the container (heat produced mainly from the electrode body) can be rapidly dissipated in a direction passing through the channel-side side wall. That is, the heat-dissipation characteristic of each of the unit cells can be heightened, and the cooling efficiency of the assembled battery can be improved. In consequence, for example, a size reduction of a cooling fan can be realized, making it possible to reduce the cost of the assembled battery.

In the assembled battery in accordance with the first aspect of the invention, a plurality of gap-filling members whose thicknesses are equal to each other may be inserted as the one or more gap-filling members in the unit cell container of at least one of the unit cells arranged, and at least one gap-filling member of the plurality of gap-filling members may be disposed between the channel-side side wall and the electrode body, and the other one or more gap-filling members may be disposed between the non-channel-side side wall and the electrode body. A total thickness of the at least one gap-filling member disposed between the channel-side side wall and the electrode body may be less than a total thickness of the gap-filling members disposed between the non-channel-side side wall and the electrode body.

Thus, since the gaps in the containers are filled in while the distribution of the gap-filling members disposed in each container is shifted to one side so that the total thickness of the at least one gap-filling member disposed between the channel-side side wall and the electrode body is thinner than the total thickness of the gap-filling members disposed between the non-channel-side side wall and the electrode body, heat produced within each container (heat produced mainly from the electrode body) can rapidly dissipate.

Therefore, the heat-dissipation characteristic of each of the unit cells can be heightened, and the cooling efficiency of the assembled battery can be improved, in comparison with the case where while the total thickness of the gap-filling members disposed in each container remains the same, the thickness of the gap-filling members close to the channel-side side wall and the thickness of the gap-filling members close to the non-channel-side side wall in each container are adjusted to be equal to each other.

Furthermore, the total thickness of the at least one gap-filling member disposed between the channel-side side wall and the electrode body may be substantially equal among the containers of the unit cells that constitute the assembled battery. According to the assembled battery having this construction, the distance between the electrode body and the channel-side side wall that most contributes to the heat dissipation from the interior of the unit cell container (i.e., the side wall that directly faces the channel) is constant among the unit cells, so that the heat-dissipation characteristic can be made uniform among the unit cells. Therefore, the degrees of aging degradation and the like of the unit cells can be made equal. As a result, increased service life of the assembled battery can be realized.

Besides, in the unit cell container of at least one of the unit cells arranged, at least two kinds of gap-filling members that are different in thickness from each other may be inserted as the gap-filling members, and, of the at least two kinds of gap-filling members, a relatively thick gap-filling member may be disposed between the non-channel-side side wall and the electrode body.

In the assembled battery constructed as described above, too, the distance between the channel-side side wall and the electrode body in each cell is relatively shorter than the distance between the non-channel-side side wall and the electrode body, so that heat produced in each container (heat produced mainly from the electrode body) can be rapidly dissipated in a direction passing through the channel-side side wall.

Incidentally, the one or more gap-filling members may be selectively disposed only between the non-channel-side side wall and the electrode in each container, without being disposed between the channel-side side wall and the electrode body.

That is, in the unit cell container of at least one of the unit cells arranged, the one or more gap-filling members may be disposed only between the non-channel-side side wall and the electrode body.

According to the assembled battery constructed as described above, since no gap-filling member is inserted between the electrode body and the channel-side side wall that most contributes to the heat dissipation from the interior of the unit cell container (i.e., the side wall that directly faces the channel), the distance therebetween is very short, so that the heat produced mainly from the electrode body can be rapidly dissipated to the outside of the cell container (concretely, to the channel), without intervention of a gap-filling member. Therefore, the heat-dissipation characteristic of each of the unit cells can be further heightened, and therefore the cooling efficiency of the assembled battery can be further improved.

Besides, a space retainer plate that is constrained together with the unit cells, with a load applied in the arrangement direction, may be disposed in a gap between the unit cells arranged. A face of the space retainer plate that faces the channel-side side wall may have a recess portion that constitutes a channel through which the cooling medium (typically, air) passes.

According to this construction, a channel that directly faces the channel-side side wall can be formed as the foregoing recess portion, that is, as the gap formed between the space retainer plate and the channel-side side wall, simultaneously with the disposal of the space retainer plate at a predetermined position. Therefore, the cooling medium can be introduced into the recess portion of the space retainer plate, and the cooling medium (typically, air) can be brought into contact with the channel-side side wall, and therefore heat produced in the unit cells can be effectively dissipated.

Besides, the one or more gap-filling members may be each formed in a sheet shape having a predetermined thickness. One or more of the gap-filling members may also be inserted between the side walls and the electrode body.

By adopting one kind of gap-filling sheets having the same shape, gaps in the unit cell containers which vary in gap size can be efficiently filled (filled in). That is, by preparing a number of gap-filling sheets that corresponds to the gap size in each container, and by adjusting the distribution of the gap-filling sheets in number in each container so that the number of the gap-filling sheets disposed between the channel-side side wall and the electrode body is less than the number of the gap-filling sheets disposed between the non-channel-side side wall and the electrode body (or, so that one or more gap-filling sheets are selectively disposed only between the non-channel-side side wall and the electrode body), it becomes possible to easily cause the total thickness of the at least one gap-filling sheet disposed between the channel-side side wall and electrode body to be thinner than the total thickness of the gap-filling sheets disposed between the non-channel-side side wall and the electrode body in each container, without a need to have a great assortment of gap-filling members of various sizes and shapes.

Besides, each of the plurality of unit cells may be provided with a flattened-shape wound electrode body formed by winding a sheet-shape positive electrode and a sheet-shape negative electrode. The plurality of unit cells may be arranged so that flattened faces of the wound electrode bodies face each other, and may be constrained, with a load applied in the arrangement direction. Then, in at least one of the plurality of unit cells, the one or more gap-filling members may be inserted between the side walls and the flattened faces of the wound electrode body.

The thicknesses of wound electrode bodies are likely to be unequal depending on the degree or state of the winding (e.g., variations in the thickness of electrode body-forming materials, etc.). Therefore, the unit cells each having such a wound electrode body are likely to vary in the size of the gap between the wound electrode body and the container side walls. However, in the foregoing construction, the employment of gap-filling members allows the thicknesses in the arrangement direction of the unit cells each containing a wound electrode body to be made uniform. Therefore, according to the assembled battery of the foregoing aspect, although the construction unit cell is a wound-type cell, both high heat-dissipation characteristic and prevention of occurrence of distortion in the arrangement direction (constraint direction) can be realized.

A second aspect of the invention is a vehicle in which an assembled battery according to the first aspect of the invention is mounted. According to the second aspect, the heat-dissipation characteristic of each of the unit cells that constitute the assembled battery heightens, and the cooling efficiency of the assembled battery improves, and the service life of the assembled battery will increase. In consequence, the reliability of the vehicle equipped with the assembled battery will improve.

BRIEF DESCRIPTION OF THE DRAWINGS

The foregoing and further features and advantages of the invention will become apparent from the following description of example embodiments with reference to the accompanying drawings, wherein like numerals are used to represent like elements, and wherein:

FIGS. 4A and 4B are diagrams schematically showing an example of a gap-filling sheet that can be inserted into each unit cell container of the assembled battery in accordance with the embodiment of the invention.

DETAILED DESCRIPTION OF EMBODIMENTS

Hereinafter, embodiments of the invention will be described below, with reference to the drawings. In the drawings described below, the members and sites that perform the same operations are represented by the same reference characters. In addition, the invention is not limited to the embodiments described below.

Figure 1:
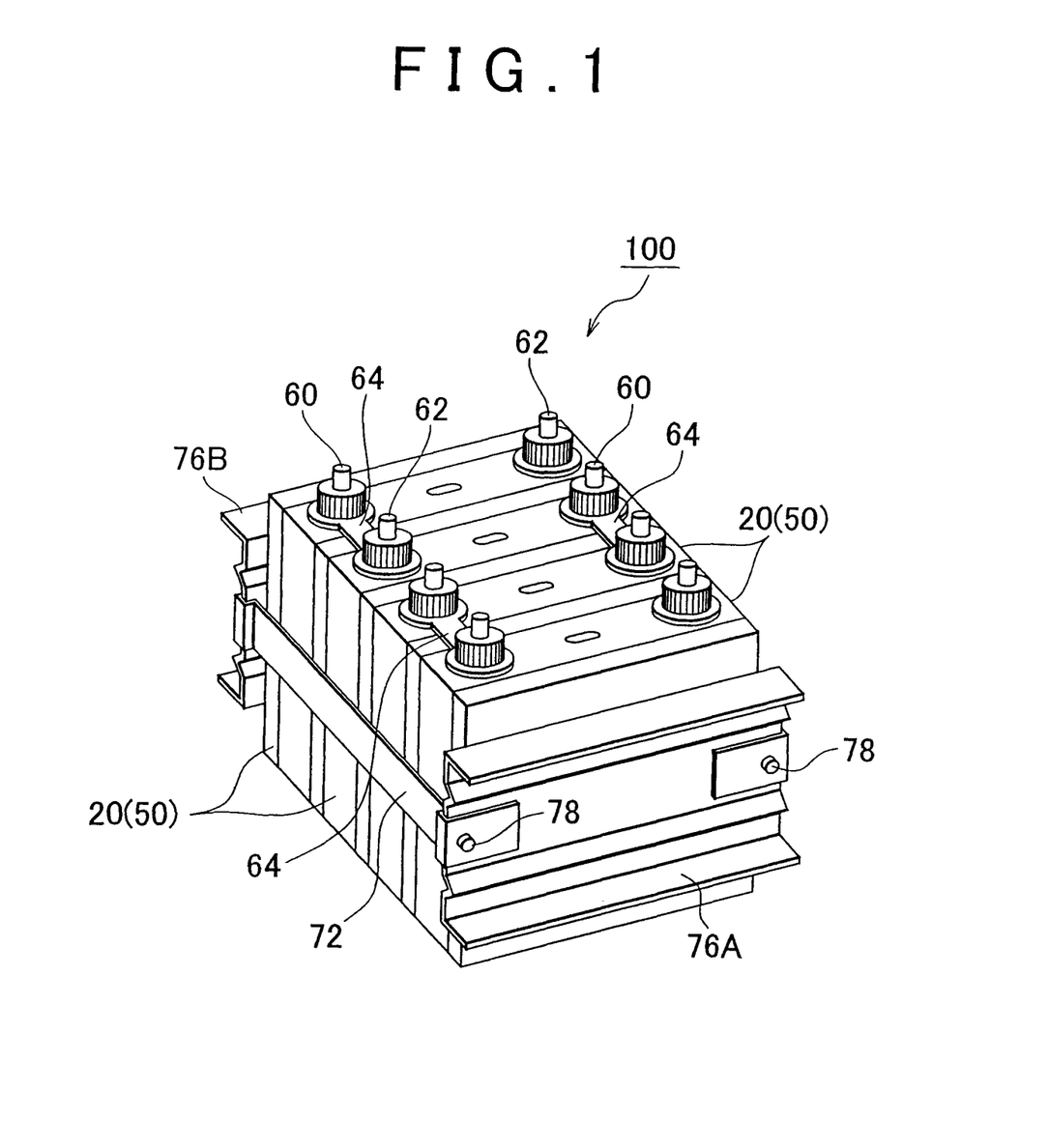
FIG. 1 is a perspective view schematically showing a construction of an assembled battery in accordance with an embodiment of the invention.

An assembled battery 100 shown in FIG. 1 is constructed of a plurality of chargeable/dischargeable electric unit cells 20 that connected in series. In the example shown in FIG. 1, four unit cells 20 that have the same configuration are arranged in series at constant intervals.

Each unit cell 20 includes an electrode body that includes a positive electrode and a negative electrode, and a container 50 that houses the electrode body and an electrolyte. The electrode body in this embodiment is a flattened-shape wound type electrode body 80 (FIG. 6) (described below). As in the unit cells employed in a typical assembled battery, the electrode body in each unit cell 20 is constructed of predetermined cell component members (active materials for the positive and negative electrodes, current collectors of the positive and negative electrodes, separators, etc.).

In this embodiment, the container 50 has such a shape as to be able to house the flattened-shape wound type electrode body 80 (a box shape in the example shown in the drawings). It suffices that the material of the container 50 be the same as the material used in a typical unit cell, and there is no particular restriction regarding the material thereof. However, from the standpoint of weight reduction of the assembled battery itself, a container made of, for example, a thin metal sheet or the like, or a synthetic resin, may be used.

On an upper surface of the container 50, there are provided a positive electrode terminal 60 electrically connected to the positive electrode of the wound electrode body 80, and a negative electrode terminal 62 electrically connected to the negative electrode of the wound electrode body 80. Between every two adjacent unit cells 20, the positive electrode terminal 60 of one of the unit cells 20 and the negative electrode terminal 62 of the other unit cell 20 are electrically connected by a connector 64. By connecting the unit cells 20 in series in this manner, an assembled battery 100 of a desired voltage is constructed.

Figure 2:
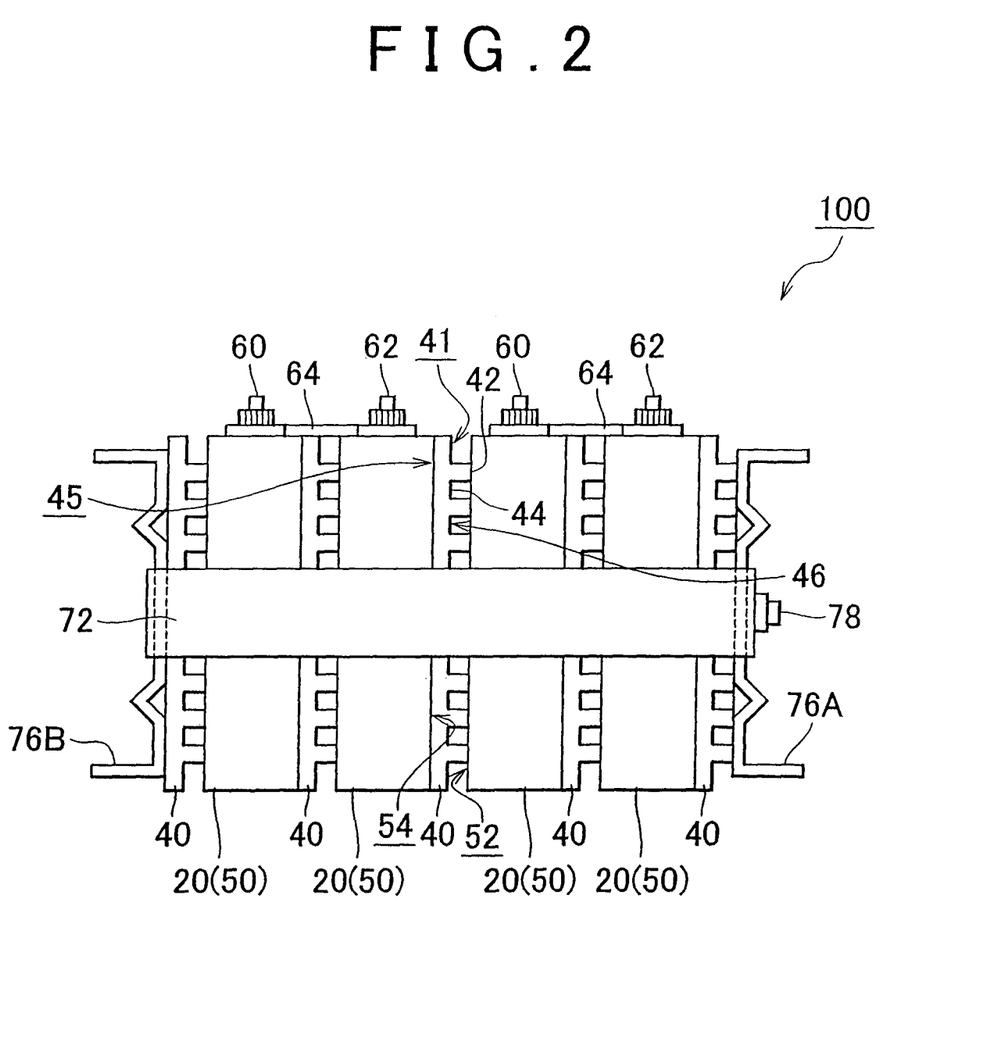
FIG. 2 is a schematic side view of the construction of the assembled battery shown in FIG. 1.

Next, a cooling mechanism of each of the unit cells 20 constituting the assembled battery 100 will be described with reference to FIG. 2 as well. FIG. 2 is a schematic side view of the construction of the assembled battery 100 shown in FIG. 1.

In this embodiment, the unit cells 20 are constrained in a state where the cells are arranged in a predetermined direction, and are given a load in the direction of arrangement. Concretely, a plurality of unit cells 20 are disposed in an alternately reversed fashion such that the positive electrode terminals 60 and the negative electrode terminal 62 are alternately aligned in the arrangement direction of the unit cells, that is, such that the positive electrode terminal 60 of a unit cell 20 is close to the negative electrode terminal of an adjacent unit cell 20. Side walls 52, 54 of adjacent containers 50 (the wider faces of each container, that is, the faces of each container 50 that faces the flattened faces of the wound electrode body 80 (described below) that is housed within the container 50), that is, the side wall 52 of a container 50 and the side wall 54 of an adjacent container 50, face each other in the arrangement direction of the unit cells 20.

The two side walls 52, 54 of each container 50, which form the foregoing wider faces facing in the arrangement direction of the containers 50, are a channel-side side wall 52 that directly faces channels 46 through which a cooling medium (typically, air) passes, and a non-channel-side side wall 54 that does not directly face the channels 46 (i.e., that does not contact the foregoing channels).

In this embodiment, the channels 46 that allow the cooling medium to pass between the unit cells 20 that are juxtaposed in the arrangement direction are automatically formed simultaneously with the disposing of space retainer plates 40 (described below) at predetermined positions. The space retainer plates 40 are disposed in gaps between the unit cells 20 aligned in the arrangement direction (in the example shown in the drawings, the space retainer plates 40 are disposed in gaps between the unit cells 20 arranged, and on the two outermost sides of the unit cells in the arrangement direction). On a face 41 of each space retainer plate 40 that faces an adjacent channel-side side wall (i.e., a side wall that directly faces the channels 46) 52, recess portions 44 that constitute the channels 46 through which the cooling medium (typically, air or the like) passes is formed. Specifically, the side face 41 of each space retainer plate has a projected-and-recessed shape in which projected portions 42 and recess portions 44 are alternately formed (i.e., a projected-and-recessed shape like a comb shape in a view from a side). By introducing the cooling medium into gaps 46 that are formed between the recess portions 44 and the channel-side side wall 52, heat produced in the unit cells 20 can be dissipated.

The space retainer plate 40 may be constructed of a material that can allow the space retainer plate 40 to function as a heat dissipation member. For example, a space retainer plate made of a metal with good heat conductivity, or a light-weight and hard synthetic resin, such as polypropylene or the like, may be used. Besides, in an example of the dimensions of the projected-and-recessed shape of the space retainer plates 40, the width of each of the projected portions 42 that are linearly formed may be about 0.2 cm, and the width of each of the linearly formed recess portions 44 may be about 0.8 cm, and the depth thereof may be about 0.2 cm. However, the dimensions of the projected-and-recessed shape may be appropriately changed in accordance with the conditions of use of the assembled battery 100 or the like. For example, when the heat-dissipation characteristic of the assembled battery is desired to be improved, it suffices to use space retainer plates in which the width dimension and/or the depth dimension of the recess portions 44 is large.

Incidentally, constraint members that constrain the unit cells 20 and the space retainer plates 40 altogether are disposed around the unit cells 20 and the space retainer plates 40 that are juxtaposed in the arrangement direction. That is, a pair of constraint plates 76A, 76B are disposed on outer sides of the outermost unit cells 20 in the cell arrangement direction. Besides, fastening beam members 72 are attached so as to bridge the two constraint plates 76A, 76B. Then, by fastening and fixing end portions of the beam members 72 to the constraint plates 76A, 76B by screws or the like 78, the unit cells 20 and the space retainer plates 40 can be constrained so that a predetermined load acts in the arrangement direction.

In the embodiment, the other side face 45 of each space retainer plate 40, that is, the face opposite from the projected-and-recessed-shape face 41, is formed flat so as to closely contact the wider side wall 54 of an adjacent container 50 (FIG. 2). In consequence, the side wall 54 of each container that is in close contact with the flat face 45 of an adjacent space retainer plates 40 does not face (not contact) the channels 46. That is, the side wall 54 of each container may be regarded as a non-channel-side side wall 54 in accordance with this embodiment. As a result of the foregoing construction, the flat faces 45 of the space retainer plates 40 can press the non-channel-side side walls 54 of the unit cell containers 50. Due to the pressing from the flat faces 45 of the space retainer plates 40, the unit cells 20 can be fastened and fixed with a predetermined load acting in the arrangement direction of the unit cells 20.

Figure 3:
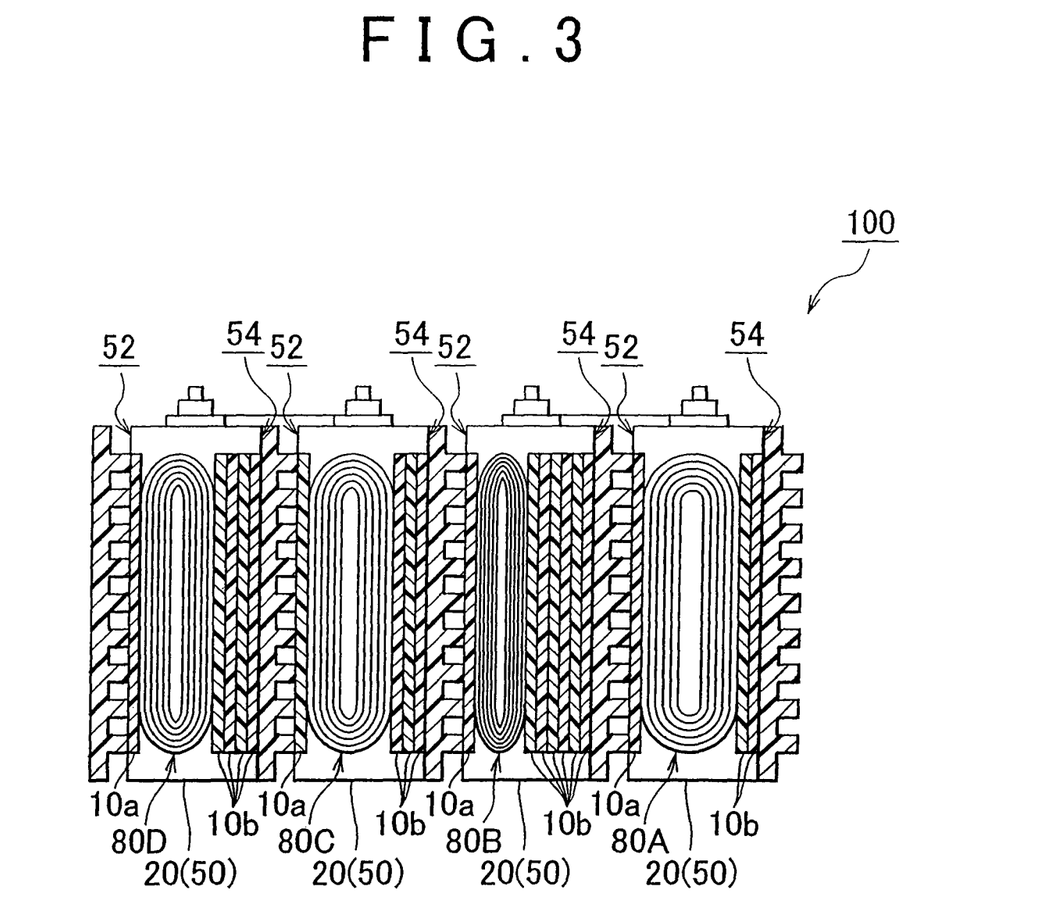
FIG. 3 is a sectional view schematically showing the state in the containers of unit cells and peripheral structures around the unit cells in a constrained state.

Next, with reference to FIG. 3 and FIGS. 4A and 4B, a construction inside the container 50 of each unit cell 20 in the embodiment will be described. FIG. 3 is a sectional view schematically showing the state within the containers 50 of the unit cells 20, and peripheral structures around the unit cells 20 in a constrained state.

The containers 50 of the unit cells 20 house electrode bodies 80A to 80D. The electrode bodies 80A to 80D in the embodiment are flattened-shape wound electrode bodies 80A to 80D as described above. As shown in FIG. 3, it sometimes happens that the thicknesses of the wound electrode bodies 80A to 80D become unequal due to the degrees or states of winding (e.g., variations of the thicknesses of various members that constitute the electrode bodies (typically, of the positive electrodes or the negative electrodes, or of the separators), etc.). This means that the dimensions of the gaps in the containers 50 of the unit cells 20 (in particular, of the gaps between the wound electrode body 80 and the two side walls 52, 54 in each unit cell 20) vary depending on the wound electrode bodies 80A to 80D that are employed.

Figure 4A:
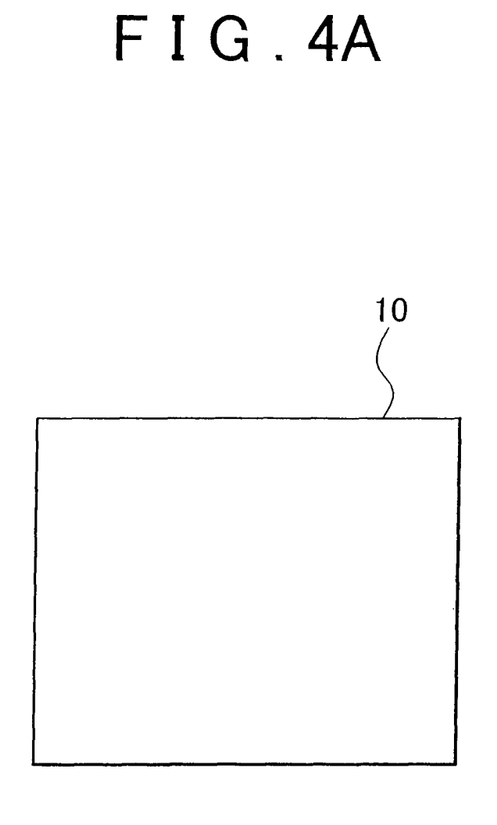
FIG. 4A is a front view.
Figure 4B:
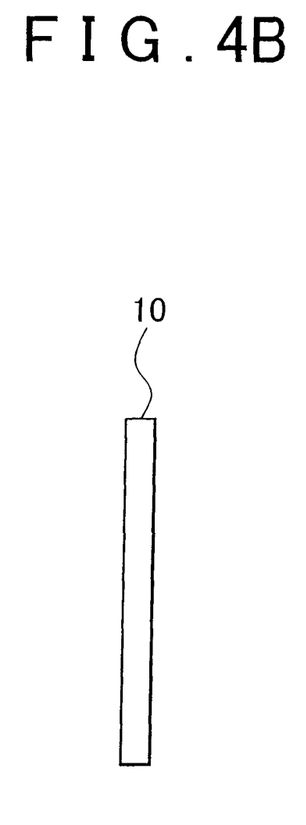
FIG. 4B is a side view.

In this embodiment, gaps in the container 50 of each unit cell 20 can be closed or filled in by using thin sheet-shaped insulating gap-filling members 10 (hereinafter, simply referred to as "gap-filling sheets") as shown in FIGS. 4A and 4B. That is, as shown in FIG. 3, gaps in the container 50 of each unit cell 20 (the gaps between the wound electrode body 80 and the two side walls 52, 54) are filled in by inserting into the gaps an appropriate number (a plural number in this embodiment) of gap-filling sheets 10 in accordance with the sizes of the gaps (the gaps between the wound electrode body 80 and the two side walls 52, 54) in the container 50.

Concretely, gap-filling sheets 10 made of a polyolefin-based resin, such as polypropylene or the like, whose thickness is 1 mm or less (typically 10 to 1000 μm, and preferably 100 to 200 μm) may be used. Alternatively, sheets obtained by coating surfaces of an aluminum-made sheet with a resin for electrical insulation may be used as gap-filling sheets. The material and thickness of the gap-filling sheets 10 can be appropriately changed in accordance with the construction conditions of the assembled battery 100 (e.g., the magnitude of the load applied to constrain the unit cells 20, or the dimensions of the gaps within the containers).

In this embodiment, in each unit cell 20, at least one of the gap-filling sheets 10 is disposed between the channel-side side wall 52 and the wound electrode body 80A to 80D, and the other gap-filling sheets are disposed between the non-channel-side side wall 54 and the wound electrode body 80A to 80D. In the example shown in FIG. 3, in each unit cell 20, one gap-filling sheet 10a is disposed between the channel-side side wall 52 and the wound electrode body 80A to 80D, and two or more (in this embodiment, two to six) gap-filling sheets 10b are disposed between the non-channel-side side wall 54 and the wound electrode body 80A to 80D. In this embodiment, the gap-filling sheets 10a, 10b are disposed in each unit cell 20 so that the distance between the channel-side side wall 52 and the electrode body 80A to 80D is shorter than the distance between the non-channel-side side wall 54 and the electrode body 80A to 80D.

Thus, by filling in the gaps in each container 50 while shifting the distribution of gap-filling sheets disposed in the container 50 to one of two side walls (i.e., to the non-channel-side side wall 54), the total thickness of the at least one gap-filling sheet 10a (one sheet in this embodiment) disposed between the channel-side side wall 52 and the wound electrode body 80A to 80D can be made thinner than the total thickness of the gap-filling sheets 10b (two to six sheets) disposed between the non-channel-side side wall 54 and the wound electrode body 80A to 80D.

According to the assembled battery 100 constructed as described above, the gaps that can be formed in one or more of the containers 50 of the unit cells 20, typically, the gaps that are formed due to nonuniform shapes of the electrode bodies 80A to 80D housed within the containers 50, can be filled in by gap-filling members 10. This prevents the external shape of one or more of the unit cells 20 from being deformed by the load that acts in the arrangement direction at the time of constraint, and therefore can make uniform the shapes of the unit cells (particularly, the thicknesses thereof in the arrangement direction).

In addition, since the gaps in the containers are filled in while the distribution of the gap-filling members disposed in each container 50 is shifted to one side so that the total thickness of the at least one gap-filling member 10a disposed between the channel-side side wall 52 and the electrode body 80A to 80D is thinner than the total thickness of the gap-filling members 10b disposed between the non-channel-side side wall 54 and the electrode body 80A to 80D, the distance between the channel-side side wall 52 and the electrode body 80A to 80D becomes shorter than the distance between the non-channel-side side wall 54 and the electrode body 80A to 80D in each unit cell, so that the electrode body 80A to 80D within each container can be disposed at a position close to the channel-side side wall 52. Therefore, heat produced within each container (heat produced mainly from the electrode body 80) can rapidly dissipate in the direction passing through the channel-side side wall 52 (i.e., toward the channels 46).

Therefore, the heat-dissipation characteristic of each of the unit cells 20 can be heightened, and the cooling efficiency of the assembled battery 100 can be improved, in comparison with the case where while the total thickness of the gap-filling members disposed in each container remains the same, the thickness of the gap-filling members 10a close to the channel-side side wall 52 and the thickness of the gap-filling members 10b close to the non-channel-side side wall 54 are adjusted to be equal to each other. In consequence, for example, a size reduction of a cooling fan can be realized, making it possible to reduce the cost of the assembled battery. Besides, the size reduction of the cooling fan also makes it possible to reduce the total size of the assembled battery and its peripheral appliances, and is therefore preferable in the case where the assembled battery is housed (installed) in a limited space, such as in a vehicle or the like. Furthermore, the size reduction of the cooling fan is also preferable because it contributes to a reduction of the noise at the time of operation of the fan.

In this embodiment, since the number of gap-filling sheets 10a on the side of the container close to the channels 46 is equal among the unit cells 20, the heat-dissipation characteristics of the unit cells 20 can be made uniform. Therefore, the degrees of aging degradation and the like of the unit cells 20 can be made equal.

In this embodiment, the adoption of gap-filling sheets 10a, 10b of a kind having the same shape as shown in FIGS. 4A and 4B makes it possible to efficiently fill (fill in) the gaps of various sizes within the unit cell containers.

That is, by preparing a number of gap-filling sheets 10 that corresponds to the gap size in each container 50, and by adjusting the distribution of the gap-filling sheets in number in each container so that the number of the gap-filling sheets 10a disposed between the channel-side side wall 52 and the electrode body 80 is less than the number of the gap-filling sheets 10b disposed between the non-channel-side side wall 54 and the electrode body 80, it becomes possible to easily cause the total thickness of the at least one gap-filling sheet 10a disposed between the channel-side side wall 52 and the electrode body 80A to 80D to be thinner than the total thickness of the gap-filling sheets 10b disposed between the non-channel-side side wall 54 and the electrode body 80A to 80D in each container, without a need to have a great assortment of gap-filling members of various sizes and shapes (e.g., a block-shaped filler member having such a thickness as to be able to singly fill a gap).

Incidentally, as shown in this embodiment, the total thickness of the gap-filling members 10 disposed between the channel-side side wall 52 and the electrode body 80A to 80D may be substantially equal among the containers 50 of the unit cells 20 constituting the assembled battery 100 (in the example shown in FIG. 3, the total thickness thereof is the thickness of one gap-filling member 10 in all the containers 50).

According to the assembled battery 100 constructed as described above, the distance between the electrode body 80A to 80D and the channel-side side wall 52 that most contributes to the heat dissipation from the interior of the unit cell container 50 (i.e., the side wall 52 that directly faces the channels 46) is constant among the unit cells 20, so that the heat-dissipation characteristic can be made uniform among the unit cells. Therefore, the degrees of aging degradation of the unit cells 20 and the like can be made equal. As a result, increased service life of the assembled battery 100 can be realized.

Incidentally, although in this embodiment, the channels 46 through which the cooling medium (typically, air) passes are formed by using the space retainer plates 40, this is not restrictive but the channels 46 may also be formed directly in the channel-side side walls 52 of the containers 50. For example, recess portions may be provided in the channel-side side wall 52 of each container 50, and the cooling medium (typically, air) may be introduced into the recess portions.

Besides, although in this embodiment, the total thickness of the gap-filling members (sheets) 10a, 10b inserted in each container 50 is adjusted by the number of gap-filling members (sheets) 10a, 10b employed (the number of sheets stacked), the adjustment thereof is not restricted to this construction. For example, at least two kinds of gap-filling members (typically, sheets) whose thicknesses are different from each other may be inserted in each container 50. For example, while in the embodiment shown in FIG. 3, the gap-filling members (sheets) are inserted and disposed in each container so that two to six gap-filling sheets 10b are stacked between the non-channel-side side wall 54 and the wound electrode body 80A to 80D, this may be modified as follows. That is, one or more thick-walled gap-filling sheets (typically, one sheet) forming a thickness equivalent to the total thickness of the plural number of gap-filling sheets 10b may be inserted and disposed between the non-channel-side side wall 54 and the wound electrode body 80A to 80D. Thus, in the case where one or more relatively thick gap-filling members (e.g., one thick-walled gap-filling member that may be equivalent to a member obtained by inter-joining a plurality of sheets as shown by reference characters 10b in FIG. 3) are disposed between the non-channel-side side wall 54 and the electrode body 80A to 80D in each container and a relatively thin gap-filling member (e.g., one sheet as shown by reference character 10a in FIG. 3) is disposed between the channel-side side wall 52 and the electrode body 80A to 80D, it is possible to obtain substantially the same effect as in the case where a plurality of gap-filling sheets 10b are employed as shown in FIG. 3.

Alternatively, the gap-filling members 10 may be disposed only between the non-channel-side side walls 54 and the electrode bodies 80A to 80D, without being disposed between the channel-side side walls 52 and the electrode bodies 80A to 80D.

Figure 5:
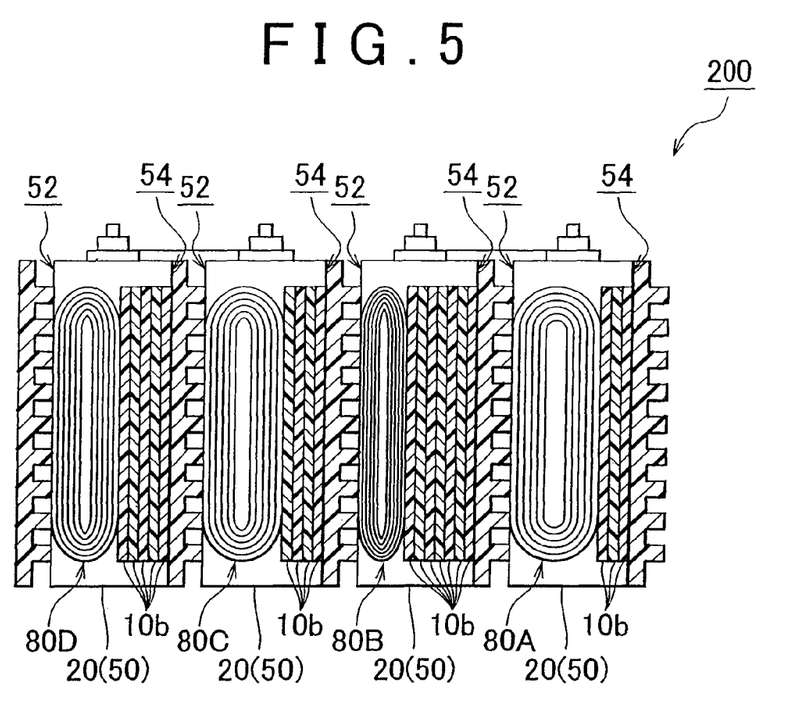
FIG. 5 is a sectional view schematically showing the state in the container of each unit cell in accordance with another embodiment of the invention.

That is, as shown in FIG. 5, in the unit cell container 50 of at least one of the arranged unit cells 20 (in the embodiment shown, all the four unit cell containers 50 juxtaposed in the arrangement direction), one or more gap-filing members (in the embodiment shown, a plurality of gap-filling sheets 10b)

for filling in the gap between the side walls 52, 54 and the electrode body 80A to 80D in each container may be inserted thereinto, and may be disposed only between the non-channel-side side wall 54 and the electrode body 80A to 80D (i.e., not disposed between the channel-side side wall 52 and the electrode body 80A to 80D) in each container.

According to the assembled battery 200 constructed as described above, the electrode body 80A to 80D in each container 50 and the channel-side side wall 52 thereof that most contributes to the heat dissipation from the interior of the unit cell container 50 (i.e., the side wall 52 that directly faces the channels 46) are close to each other, so that heat produced mainly from the electrode bodies 80A to 80D can be rapidly dissipated to the outside of the cell container 50 (concretely, into the channels) without the intervention of the gap-filling member 10. Therefore, the heat-dissipation characteristic of each unit cell 20 can be further heightened, and the cooling efficiency of the assembled battery 200 can be further improved.

In order to confirm the effect of the assembled battery in accordance with this embodiment, the present inventors performed an experiment in which the battery temperature during the charging-discharging process was measured by using assembled batteries in each of which about four to eight lithium-ion secondary cells (wound-type lithium-ion cells housed in cell containers having a box shape (rectangular shape) as shown in the drawings) were arranged as unit cells. Specifically, assembled batteries in each of which gap-filling sheets were inserted only along the non-channel-side side wall (i.e., the side wall not facing the channels of an adjacent space retainer plate) of each unit cell container and the total thickness of the gap-filing sheets inserted was adjusted when unit cells were incorporated into the assembled battery (e.g., assembled batteries as shown in FIG. 5) were prepared. Then, with respect to the foregoing assembled batteries, the charging and discharging at 30 Å for 30 seconds for each process (30 seconds for the charging, and another 30 seconds for the discharging) was repeated for 20 cycles. In addition, in this experiment, air (cooling wind) was used as a cooling medium, and the amount of flow of the cooling wind during the charging-discharging process was set to be 35 m$^3$/hr.

The battery temperature reached during the charging-discharging process in this manner was measured, and it was confirmed that the temperature rise was curbed to a maximum of 43° C., and that the cooling effect achieved by the assembled battery was improved by the avoidance of insertion of a gap-filling sheet between the channel-side side wall and the electrode body in each unit cell container.

Another experiment using assembled batteries in each of which the total thickness of the gap-filling sheets disposed in each container was the same as in the foregoing experiment and the total thickness of the channel-side side wall-side gap-filling sheets and the total thickness of the non-channel-side side wall-side gap-filling sheets were adjusted to be equal to each other, was performed under the same conditions as in the foregoing experiment. As a result, it was found that the temperatures of the batteries rose to a maximum of 59° C., and that the assembled batteries did not provide good cooling effect, as compared with the foregoing assembled batteries examined in the foregoing experiment. This has confirmed the advantage of the cooling effect improvement being achieved by filling in the gaps in the containers with gap-filling sheets while shifting the distribution of the gap-filling sheets in each container to one side although the total thickness of the gap-filling sheets is the same among the containers.

The constructions of the unit cells 20 that can be employed in this embodiment, and the members, materials, etc. that constitute each unit cell 20 will be described in detail below.

Figure 6:
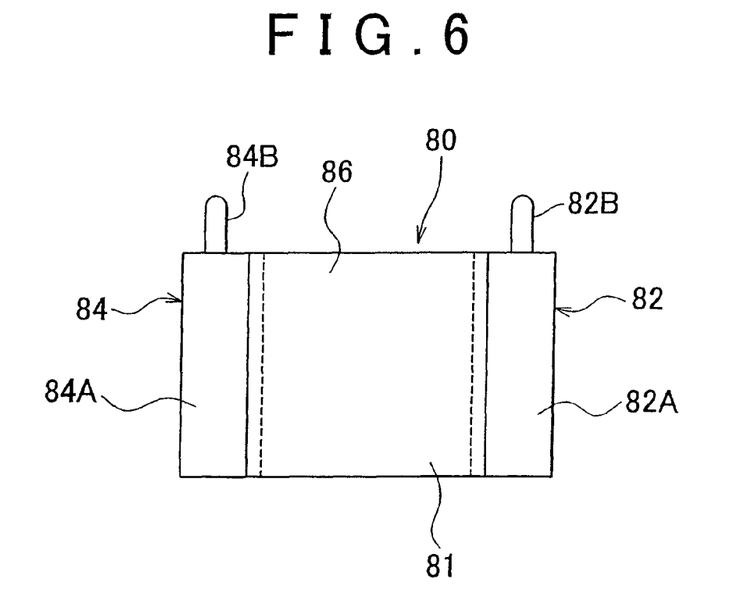
FIG. 6 is a front view schematically showing an example of a wound electrode body.

The wound electrode body 80 in accordance with this embodiment is a flattened-shape wound electrode body 80, as shown in FIG. 6, that is fabricated by stacking a sheet-shape positive electrode 82 (hereinafter, referred to as "positive electrode sheet 82"), and a sheet-shape negative electrode 84 (hereinafter, referred to as "negative electrode sheet 84") together with a total of two sheet-shape separators 86 (hereinafter, referred to as "separator sheets 86") as in the wound electrode body in a usual lithium-ion cell, and then winding the stacked sheets while slightly shifting the positive electrode sheet 82 and the negative electrode sheet 84 from each other in a direction perpendicular to the winding direction, and then pressing and flattening the wound body in directions across the side faces.

As a result of the winding of the stacked sheets while slightly shifting the positive electrode sheet 82 and the negative electrode sheet 84 from each other in a direction perpendicular to the winding direction of the wound electrode body 80, an end portion of the positive electrode sheet 82 and an end portion of the negative electrode sheet 84 are protruded out from a winding core portion 81 (i.e., a portion in which a positive electrode active material layer-forming portion of the positive electrode sheet 82, a negative electrode active material layer-forming portion of the negative electrode sheet 84, and the separator sheets 86 are closely wound). The positive electrode-side protruded portion (i.e., a positive electrode active material layer-non-forming portion) 82A, and the negative electrode-side protruded portion (i.e., a negative electrode active material layer-non-forming portion) 84A are provided with a positive lead terminal 82B and a negative lead terminal 84B, respectively, and are electrically connected to the positive electrode terminal 60 and the negative electrode terminal 62, respectively.

Incidentally, it suffices that the materials and the members that constitute the wound electrode body 80 be the same as those of the lithium-ion cell electrode body according to a related art, and there are no particular restrictions regarding the materials and the members. For example, the positive electrode sheet 82 may be formed by applying a lithium-ion cell-purpose positive electrode active material layer on an elongated positive electrode current collector. For the positive electrode current collector, an aluminum foil (in this embodiment) and other metal foils suitable to the positive electrode may be used. As for the positive electrode active material, one or more species of substances for use in a lithium-ion cell according to the related art may be used without any particular limitation. Preferred examples thereof include $LiMn_2O_4$, $LiCoO_2$, $LiNiO_2$.

On the other hand, the negative electrode sheet 84 may be formed by applying a lithium-ion cell-purpose negative electrode active material layer on an elongated negative electrode current collector. For the negative electrode current collector, a copper foil (in this embodiment) and other metal foils suitable to the negative electrode may be used. As for the negative electrode active material, one or more species of substances for use in a lithium-ion cell according to the related art may be used without any particular limitation. Preferred examples thereof include carbon-based materials, such as graphite carbon, amorphous carbon, etc., lithium-containing transition metal oxides, transition metal nitrides, etc.

Furthermore, preferred examples of the separator sheets 86 used between the positive and negative electrode sheets 82, 84 include porous polyolefin-based resin-made sheets. For example, porous separator sheets made of a synthetic resin (e.g., of polyolefin such as polyethylene or the like) that has a length of about 2 to 4 m (e.g., 3.1 m), a width of about 8 to 12 cm (e.g., 11 cm), and a thickness of about 5 to 30 μm (e.g., 25 μm) may be used. In addition, in the case where the electrolyte used is a solid electrolyte or a gel electrolyte, the separators may sometimes be unnecessary (in which case, the electrolyte itself can function as a separator). In addition, the electrode body housed in the container of each unit cell is not limited to the foregoing wound-type electrode body. For example, the electrode body may be a stacked-type electrode body formed by alternately stacking positive electrode sheets and negative electrode sheets together with separators (or a solid or gel electrolyte that can function as a separator as well).

Subsequently, the construction of the electrolyte housed together with the wound electrode body 80 within the container 50 will be described. The electrolyte in this embodiment is, for example, a lithium salt such as $LiPF_6$ or the like. In this embodiment, a solution obtained by dissolving an appropriate amount (e.g., a concentration of 1 M) of a lithium salt, such as $LiPF_6$ or the like, in a non-aqueous electrolyte liquid, such as a mixed solvent of diethyl carbonate and ethylene carbonate (e.g., at a mass ratio of 1:1) is used as an electrolyte solution. The unit cell 20 of this embodiment is constructed by housing the wound electrode body 80 and one or more gap-filling sheets 10 within a container 50, and pouring the foregoing electrolyte solution thereinto, and then sealing the container. Then, the assembled battery 100 of this embodiment is constructed by arranging such unit cells 20 in a predetermined arrangement direction, and then constraining the unit cells 20 and the space retainer plates 40 in the arrangement direction.

Figure 7:
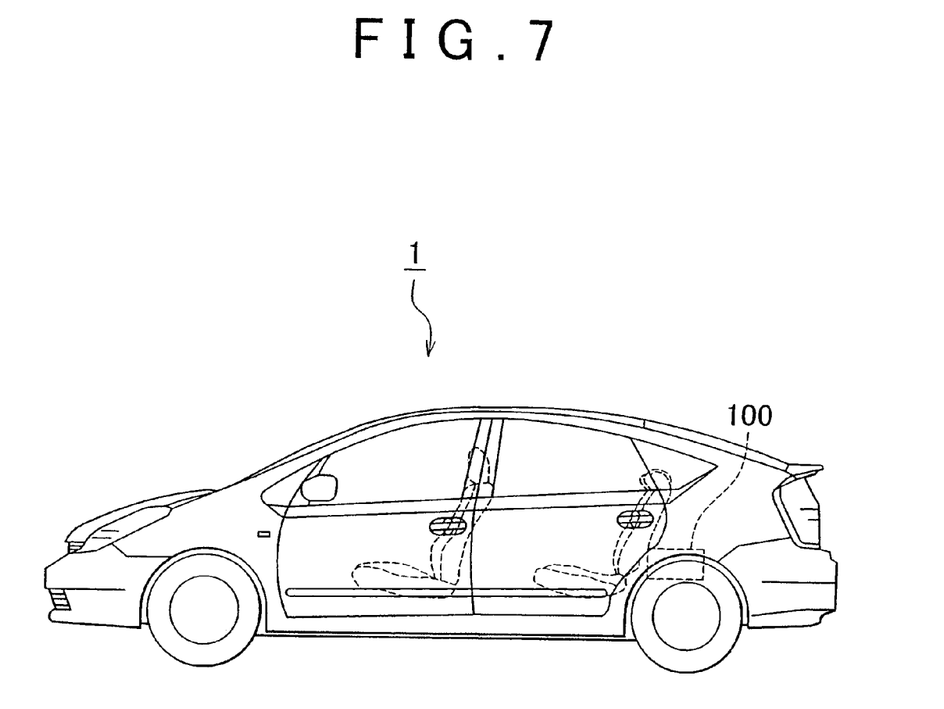
FIG. 7 is a side view schematically showing a vehicle (motor vehicle) equipped with the assembled battery in accordance with the embodiment of the invention.

The assembled batteries 100, 200 in accordance with the embodiments can each be suitably used particularly as a motor (electric motor)-purpose electric power source mounted in a vehicle such as a motor vehicle or the like. Therefore, this invention can provide a vehicle 1 equipped with the foregoing assembled battery 100, 200 (typically, a motor vehicle or, particularly, a motor vehicle equipped with an electric motor, such as a hybrid motor vehicle, an electric motor vehicle, or a fuel-cell motor vehicle).

While the invention has been described with reference to preferred embodiments, the foregoing descriptions are not of limitative features or the like, but various modifications and the like are possible.

For example, in the case where the assembled battery is mounted in a vehicle such as a motor vehicle, a greater number of unit cells can be connected in series, and an exterior cover for protecting main portions (unit cell groups, and the like) of the assembled battery, component parts for fixing the assembled battery at a predetermined site of the vehicle, component parts for interlinking a plurality of assembled batteries (battery modules) with one another, etc., can be provided. However, the presence/absence of such equipment does not change the technical scope of the invention.

Besides, the kind of the unit cell is not limited to the foregoing lithium-ion cell. The unit cell of the invention may also be any one of various cells that are different in the electrode body component materials or in the electrolyte, for example, a lithium secondary cell that employs a lithium metal or a lithium alloy as a negative electrode, a nickel hydride cell, a nickel-cadmium cell, or a so-called physical cell such as an electric double layer capacitor.

The invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. An assembled battery comprising a plurality of unit cells that are arranged in an arrangement direction, wherein
    each of the unit cells includes an electrode body that includes a positive electrode and a negative electrode, and a container that houses the electrode body;
    two side walls of each unit cell container that are juxtaposed in the arrangement direction are a channel-side side wall that directly faces a channel through which a cooling medium passes, and a non-channel-side side wall that does not directly face the channel; and
    in the unit cell container in every unit cell, one or more gap-filling members that fill in a gap between the electrode body and the two side walls are inserted, and the one or more gap-filling members are disposed so that a distance between the channel-side side wall and the electrode body is shorter than a distance between the non-channel-side side wall and the electrode body;
    wherein:
    a plurality of gap-filling members whose thicknesses are equal to each other are inserted as the one or more gap-filling members in the unit cell container in every unit cell;
    at least one gap-filling member of the plurality of gap-filling members is disposed between the channel-side side wall and the electrode body, and other one or more gap-filling members are disposed between the non-channel-side side wall and the electrode body; and
    a total thickness of the at least one gap-filling member disposed between the channel-side side wall and the electrode body is less than a total thickness of the gap-filling members disposed between the non-channel-side side wall and the electrode body.

2. The assembled battery according to claim 1, wherein:
    in the unit cell container in every unit cell, at least two kinds of gap-filling members that are different in thickness from each other are inserted as the gap-filling members; and
    of the at least two kinds of gap-filling members, a relatively thick gap-filling member is disposed between the non-channel-side side wall and the electrode body.

3. The assembled battery according to claim 1, wherein in the unit cell container in every unit cell, the one or more gap-filling members are disposed only between the non-channel-side side wall and the electrode body.

4. The assembled battery according to claim 1, wherein:
    a space retainer plate that is constrained together with the unit cells, with a load applied in the arrangement direction, is disposed in a gap between the unit cells arranged; and
    a face of the space retainer plate that faces the channel-side side wall has a recess portion that constitutes a channel through which the cooling medium passes.

5. The assembled battery according to claim 1, wherein:
    the one or more gap-filling members are each formed in a sheet shape having a predetermined thickness; and
    one or more of the gap-filling members are inserted between the side walls and the electrode body.

6. The assembled battery according to claim 1, wherein:
    each of the plurality of unit cells is provided with a flattened-shape wound electrode body formed by winding a sheet-shape positive electrode and a sheet-shape negative electrode;

the plurality of unit cells are arranged so that flattened faces of the wound electrode bodies face each other, and are constrained, with a load applied in the arrangement direction; and in every unit cell, the one or more gap-filling members are inserted between the side walls and the flattened faces of the wound electrode body.

7. A vehicle comprising the assembled battery according to claim 1.

8. The assembled battery according to claim 1, wherein the total thickness of the at least one gap-filling member disposed between the channel-side side wall and the electrode body is substantially equal among the containers of the unit cells that constitute the assembled battery.

9. The assembled battery according to claim 1, wherein a number of the at least one gap-filling member of the plurality of gap-filling members disposed between the channel-side side wall and the electrode body of each unit cell container in every unit cell is equal.

* * * * *